United States Patent [19]

MacLaury et al.

[11] 4,273,691

[45] Jun. 16, 1981

[54] FLAME RETARDANT COMPOSITIONS AND COATED ARTICLE

[75] Inventors: Michael R. MacLaury, Rexford; Fred F. Holub, Schenectady, both of N.Y.

[73] Assignee: General Electric Company, Schenectady, N.Y.

[21] Appl. No.: 85,900

[22] Filed: Oct. 18, 1979

[51] Int. Cl.³ .................. B32B 25/20; C08L 83/04; D02G 3/00
[52] U.S. Cl. .................. 260/23 S; 106/17; 106/18; 106/18.11; 106/18.12; 106/18.26; 260/18 TN; 260/23 H; 260/DIG. 24; 428/375; 428/391; 428/921
[58] Field of Search .................. 428/921, 391, 375; 260/DIG. 24, 23 S, 23 H, 18 TN, 45.85 R; 106/17, 18, 18.11, 18.12, 18.26

[56] References Cited

U.S. PATENT DOCUMENTS

| | | | |
|---|---|---|---|
| 2,888,424 | 5/1959 | Precopio et al. | 260/37 R |
| 3,079,370 | 2/1963 | Precopio et al. | 525/335 |
| 3,086,966 | 4/1963 | Mageli et al. | 260/DIG. 28 |
| 3,138,565 | 6/1964 | Rosenberger et al. | 260/DIG. 24 |
| 3,214,422 | 10/1965 | Mageli et al. | 525/387 |
| 3,396,132 | 8/1968 | Perry et al. | 260/45.85 R |
| 3,741,893 | 6/1973 | Mascioli et al. | 260/DIG. 24 |
| 3,971,756 | 7/1976 | Bialous et al. | 260/DIG. 24 |
| 4,028,328 | 6/1977 | Rubin | 260/45.85 R |
| 4,123,586 | 10/1978 | Betts et al. | 260/45.75 B |
| 4,184,995 | 1/1980 | Noble | 260/DIG. 24 |

*Primary Examiner*—Ronald W. Griffin
*Attorney, Agent, or Firm*—William A. Teoli; James C. Davis, Jr.

[57] ABSTRACT

Flame retardant compositions are provided in the form of blends of organic polymer, silicone polymer, and Group IIA metal $C_{(6-20)}$ carboxylate salt. The flame retardant compositions can be used as wire coating compositions.

15 Claims, 1 Drawing Figure

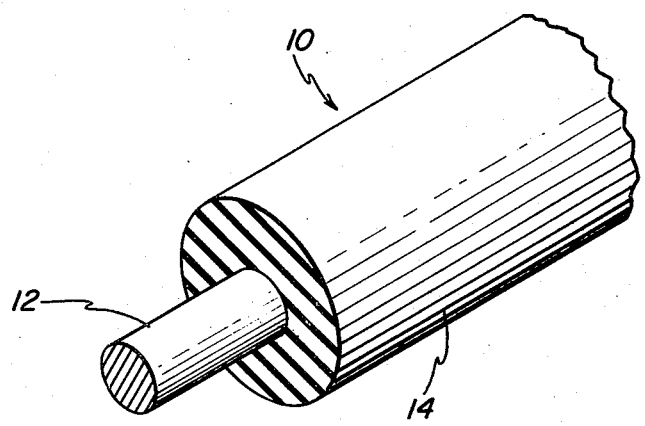

FLAME RETARDANT COMPOSITIONS AND COATED ARTICLE

CROSS REFERENCE TO RELATED APPLICATIONS

Reference is made to copending application of Joseph E. Betts and Fred F. Holub, Ser. No. 816,854 now U.S. Pat. No. 4,209,566, issued June 24, 1980, and Ser. No. 816,855, filed July 18, 1977, now abandoned, for Flame Resistant Compositions and Electrical Products Thereof and Ser. No. 006,713, filed Jan. 26, 1979 and U.S. Pat. No. 4,123,586 assigned to the same assignee as the present invention.

BACKGROUND OF THE INVENTION

The present invention relates to flame retardant compositions which are blends of organic polymer, silicone polymer and Group IIa $C_{(6-20)}$ metal carboxylate salt.

Prior to the present invention, as shown by Betts et al U.S. Pat. No. 4,123,586, a mixture of silicone gum and a dibasic lead salt, such as lead phthalate, was effective as a flame retardant for cross-linked polyolefins. However, those skilled in the art know that many lead compounds are known to be toxic. It is therefore desirable to minimize the use of lead in many applications, particularly applications in the food industry requiring compositions which, if lead containing, would substantially create food consumption risks.

STATEMENT OF THE INVENTION

The present invention is based on the discovery that certain carboxylic acid salts of Group IIa elements, such as magnesium stearate can be used in combination with silicone gum to impart improved flame retardant properties to a variety of organic polymers including polyolefins, polyesters, polycarbonates, polyamides, etc. It has been found that the flame retardant properties of a variety of such organic polymers can be substantially improved as shown by oxygen index values and horizontal burning times (HBT) when the aforementioned combination of such Group IIa carboxylic acid salt and silicone is incorporated in such organic polymers.

There is provided by the present invention, flame retardant compositions comprising by weight, (A) 70 to 98% of organic polymer,
(B) 1 to 10% of silicone, and
(C) 1 to 20% of Group IIa metal $C_{(6-20)}$ carboxylic acid salt.

Organic polymers which can be used to make the flame retardant compositions of the present invention are, for example, low density polyethylene (LDPE) having a density of 0.91 g/cm³ to 0.93 g/cm³; high density polyethylene (HDPE) having a density of 0.94 g/cm³ to 0.97 g/cm³; polypropylene having a density of about 0.91 g/cm³, polystyrene (HIPS), Lexan polycarbonate, and Valox polyester, both manufactured by the General Electric Company, and other polymers such as polyamides, ionomers, polyurethanes, ter polymers of acrylonitrile-butadiene and styrene, etc. The term "silicone" includes polydiorganosiloxanes consisting essentially of chemically combined units of the formula,

where R is a monovalent organic radical selected from the class consisting of $C_{(1-8)}$ alkyl radicals, $C_{(6-13)}$ aryl radicals, halogenated derivatives of such radicals, cyanoalkyl radicals, etc. The aforementioned polydiorganosiloxanes are preferably polydimethylsiloxanes which can contain from about 0.05 to 15 mole percent based upon the total moles of chemically combined diorganosiloxy units of methylvinylsiloxy units. The aforementioned polydiorganosiloxanes are preferably in the form of gums having a penetration value of 400 to 4000, etc.

Included within the Group IIa metal carboxylic acid salts which can be utilized in the practice of the present invention are, for example, magnesium stearate, calcium stearate, barium stearate, strontium stearate. Salts of other carboxylic acids include, isostearate, oleate, palmitate, myristate, lacerate, undecylenic, 2-ethylhexanoate, pivaleate, hexanoate, etc.

In addition to the aforementioned ingredients, the flame retardant compositions of the present invention can contain additional ingredients, such as fumed silica, described in U.S. Pat. No. 2,888,424 and a type which is sold under the trade designation of Cabosil MS7 of Godfrey L. Cabot of Boston, Mass. In particular instances, ingredients such as decabromodiphenylether, antimony oxide, antioxidants, processing aids and clay also can be utilized. If desired, heat activated peroxides can be employed when utilizing polyolefins as the organic polymer suitable reactive peroxides are disclosed in U.S. Pat. Nos. 2,888,424, 3,079,370, 3,086,966 and 3,214,422. Suitable peroxides cross-linking agents include organic tertiary peroxides which decompose at a temperature of above about 295° F. and thereby provide free-radicals. The organic peroxides can be used in amounts of from about 2 to 8 parts by weight of peroxide per 100 parts of organic polymer. A preferred peroxide is dicumyl peroxide, while other peroxides such as VulCup R ® of Hercules Inc., a mixture of para and meta $\alpha,\alpha'$,-bis(t-butylperoxy)diisopropylbenzene, etc., can be used. Curing coagents such as triallyl cyanurate can be employed in amounts of up to about 5 parts by weight of coagent, per 100 parts of the polymer if desired. The polyolefins can be irradiated by high energy electrons, x-ray and the like sources.

In the practice of the invention, the flame retardant compositions can be made by mixing together the (A) organic polymer with (B) the silicone gum and (C) the Group IIa carboxylic acid salt, hereinafter referred to as the "Group IIa salt" by means of any conventional compounding or blending apparatus, such as a Banbury mixer or on a two-roll rubber mill.

Preferably, all the ingredients are formulated together except those which are sensitive to the temperatures in the range of from about 300° F. to about 400° F., such as heat decomposable peroxides. The (A), (B) and (C) ingredients are therefore at a temperature sufficient to soften and plasticize the particular organic polymer if feasible. An effective procedure, for example, would be to uniformally blend the aforementioned ingredients at a suitable temperature with the absence of the organic peroxide, then introduce the organic peroxide at a lower temperature to uniformally incorporate into the mixture.

The proportions of the various ingredients can vary widely depending upon the particular application intended. For example, for effective flame retardance there can be employed per 100 parts of organic polymer from about 0.5 to 10 parts of the silicone and 0.5 to 20 parts of the Group IIa salt. However, greater or smaller amounts can suffice in particular applications. In addition to the aforementioned ingredients, additives as previously indicated, such as antimony oxide can be utilized in a proportion from 1 to 10 parts, and organic halogen compounds from 5 to 30 parts, per 100 parts of the organic polymer while reinforcing fillers such as silica can be employed in a proportion of from 0.1 to 5 parts per 100 parts of the organic polymer.

In the drawing there is shown an insulated wire or cable product.

More particularly, the drawing shows at 10, an insulated wire or cable product consisting of a metallic conductive element at 12 and insulated conductor at 14.

The flame retardant composition of the invention can be extruded onto a conductor and in particular instances, crosslinked depending on whether organic peroxide curing agent is present. The flame retardant compositions of the present invention also can be utilized in other applications such as appliance housing (hairdriers, TV cabinets, smoke detectors, etc., automotive interiors, fans, motors, electrical components, coffee makers, pump housings, power tools, etc.).

In order that those skilled in the art will be better able to practice the invention, the following examples are given by way of illustration and not by way of limitation. All parts are by weight.

EXAMPLE 1

A blend of low density polyethylene EH 497 having a density of about 0.92, and manufactured by the Cities Service Company, a polydimethylsiloxane gum having about 0.2 mole percent of chemically combined methylvinylsiloxy units and a penatration of between 1600 and 2500, VulCup R ® which is an organic peroxide, and a Group IIa metal stearate were blended in a Brabender mixing bowl at 120° C. for 30 minutes. Additional samples were prepared using other Group IIa metal stearates. Various blends were then compression molded for 30 minutes at 180° C. into a 4"×4"×⅛" slabs. In one instance a magnesium stearate was further blended with decabromodiphenylether and antimony trioxide. The various molded slabs were then evaluated for flame retardance employing a self-extinguishing "SE" burn test which was measured in the horizontal position and in one instance in the vertical position. In addition, the Oxygen Index or "OI" of the respective molded slabs was also measured in terms of percent of oxygen in the test atmosphere needed to support at least 3 minutes of combustion.

The Horizontal Burn Time (HBT) was measured by allowing the test slab to burn up to two inches to determine its burn time unless it went out before two inches, i.e. self-extinguished "SE," and the burn time was not recorded. In the event that the slab could not be ignited, it also was referred to as self-extinguishing "SE." In certain cases the slab was tested within the vertical position to determine the period of time it would take to burn two inches. In the event that the flame went out before two inches, it was referred to as "SEV."

The following results were obtained when the various slabs were evaluated based on blends containing 45 parts of LDPE, 2 parts of silicone, 1.8 part of VulCup R ® and 3 parts of Group IIa salt.

TABLE I

| Group IIa Salt | Horizontal Burn Time (min) | Oxygen Index |
| --- | --- | --- |
| Mg stearate | SE | 24 |
| Ca stearate | SE | 22.8 |
| Sr stearate | SE | 20 |
| Ba stearate | SE | 23.2 |
| Ca stearate | SE | 22.6 |

The same blend free of silicone and Group IIa salt of 45 parts of LDPE and 1.8 part of VulCup R ® was found to have a horizontal burning time of 1.7 minute and an OI of 16.5.

It was further found that when the magnesium stearate was reduced by 1.5 parts in the original mixture, no change occurred in the flame retardant properties of the molded slab. However, when the reduction in magnesium stearate was combined with a reduction of 1 part of the silicone, the oxygen index rose to 25.1. In addition to the original composition, there was further added 7 parts of decabromodiphenylether and 2 parts of antimony trioxide which resulted in an oxygen index of 25.8 and a slab which was capable of self-extinguishment in the vertical position. However, when the magnesium stearate was removed from the composition, the oxygen index dropped to 21.2.

It was further found that the molded slab free of silicone containing three parts of the magnesium stearate had a horizontal burn time of 1.8 minutes and an oxygen index of 17.9.

Additional blends were prepared following the above procedure utilizing 45 parts of LDPE, 2 parts of silicone, 1.8 part of VulCup R ® and 3 parts of various metal salts, metal oxides and in one instance phthalic acid. It was found that mercury and magnesium oxide, and phthalic acid had OI values of about 17.9 to 18.3, their HBT values were about 2.6 min. Unlike Group IIa metal carboxylates of Table I, magnesium C(1-6) carboxylates were found to have HBT values averaging 2-2.5 minutes and OI values of about 17.9. Magnesium oleate was found to have an OI of 25.1 and a HBT of 3.7

EXAMPLE 2

The procedure of Example 1 was repeated, except that the organic peroxide was omitted from the formulation. The blends therefore consisted of 45 parts of LDPE, 2 parts of silicone and 3 parts of Group IIa metal salt and the blends were mixed at 120° C. in a Brabender mixer for 30 minutes and compression molded at 180° C. for 10–30 minutes. The slabs were then evaluated for flame retardance and the following results were obtained:

TABLE II

| Metal Salt | Horizontal Burn Time | Oxygen Index |
| --- | --- | --- |
| Mg stearate | SE | 24 |
| Ca stearate | SE | 20 |
| Sr stearate | SE | 21.6 |
| Ba stearate | SE | 20 |

It was found that the horizontal burn time of the LDPE free of silicone and metal salts was 1.3 and its Oxygen Index was 17. A silicone-free slab having added magnesium stearate showed a slight improvement in horizontal burn time (2.7) and oxygen index 17.9. Improved results were achieved when the magnesium stearate was reduced to 1.5 parts while maintaining the silicone at 2 parts, which resulted in an SE slab having an oxygen index of 25.1 which was reduced to 22 when the silicone was reduced to 1 part.

Additional formulations were evaluated consisting of 100 parts of LDPE, 8 parts of silicone gum, 2 parts of fumed silica, 3 parts of a polydimethylsiloxane fluid, 2 parts of antioxidant Agerite MA, 3 parts of VulCup R ® peroxide and 18 parts of Group IIa metallic stearate. Slabs were evaluated by measuring horizontal burning distance which is the length of burning in inches after 30 seconds and a 10 second flame ignition 90° to the horizontal mount of a bar 4"×⅛"×½" which was pressed and cured at 360° F. for 45 minutes. In addition, the drip behavior of the slabs were also determined as shown in Table III below:

TABLE III

| Metal Salt | Horizontal Burning Distance | Drip Behavior |
| --- | --- | --- |
| None | 2" | Drips |
| Ca Stearate | SE | No Drip |
| Mg Stearate | SE | No Drip |

Additional blends were prepared consisting of 45 parts of LDPE, 1.5 part of magnesium stearate and .1 part of silicone. The nature of the silicone was varied to determine the effect of the silicone on the flame retardant properties of the resulting cured slabs. In one instance, for example, in place of the methylvinyl gum described above, SE-30 was utilized which is a polydimethylsiloxane free of methylvinyl siloxy units having a penetration value of about 730. In addition, various silicone resins were evaluated such as "Resin A" consisting of 98% methylsiloxy units chemically combined with about 2 mole percent of dimethylsiloxy units, while "Resin B" consisted of 47 mole percent of methylsiloxy units and 5 mole percent of dimethylsiloxy units. In addition, "Resin C" consisted of trimethylsiloxy units and tetrasiloxy units having an M/Q ratio of about 0.6–0.7. The various blends were mixed at 120° C. in A Brabender for 30 minutes and compression molded at 180° C. for 10 minutes. The following results were obtained, where MV represents a 0.2 mole percent vinyl methyl gum and SE-30 represents a polydimethylsiloxane:

TABLE IV

| Silicone | Horizontal Burn Time | Oxygen Index |
| --- | --- | --- |
| MV | SE | 22 |
| SE-30 | SE | 24.7 |
| Resin A | 2.8 | 22.4 |
| Resin B | 3.1 | 18.3 |
| Resin C | 3.3 | 17.8 |

The above results show that the silicone utilized in the practice of the present invention is preferably a polydiorganosiloxane consisting essentially of chemically combined diorganosiloxy units.

EXAMPLE 3

A blend of 45 parts of polypropylene, 2 parts of the methylvinyl siloxane utilized in Example 1, and 3 parts of magnesium stearate was prepared in a Brabender at 100° C. for 30 minutes. The polypropylene utilized was Hercules No. 640. Slabs were compression molded at 200° C. for 30 minutes. In addition to the aforementioned blends, additional blends were prepared having 6 parts of decabromodiphenylether, 2 parts of antimony trioxide added to the original blend. Further slabs were also made free of the silicone and magnesium stearate, but containing the antimony trioxide and the decabromodiphenyl. The various 4"×½"×⅛" slabs were then evaluated for horizontal burn time and oxygen index and the following results were obtained, where A is a control free of any flame retardant additives, B is the composition containing silicone and magnesium stearate, C is the blend containing silicone, magnesium stearate, antimony trioxide and decabromodiphenylether and D is a blend containing decabromodiphenylether and antimony trioxide as flame retardants free of silicone and magnesium stearate:

TABLE V

| Blend | Horizontal Burn Time | Oxygen Index |
| --- | --- | --- |
| A (control) | 1.9 | 17.4 |
| B | SE drip | 23.2–24 |
| C | SE drip | 23.2 |
| D | SE drip | 25.8 |

The above results show that the magnesium stearate and silicone (B) utilized at 5 parts were equivalent to the antimony trioxide, decabromodiphenylether blend (D) utilized at 8 parts, while both blends as well as blend (C) were significantly better than the control "A."

Additional blends were prepared utilizing 45 parts of high impact polystyrene, Foster Grant No. 834, 2 parts of the silicone of Example 1, and 3 parts of magnesium stearate (F). In addition, blend (G) contained a 5 part preblend of equal parts of silicone and magnesium stearate. Additional blends (H) utilized one part of antimony trioxide and 3 parts of decabromodiphenylether, while (J) employed a combination of 2 parts of silicone, 3 parts of magnesium stearate, 1 part of antimony trioxide and 3 parts of decabromodiphenylether. Blend (E) was the control which was free of any flame retardants. The following results were obtained:

TABLE VI

| Blend | Horizontal Burn Time | Oxygen Index |
| --- | --- | --- |
| E | 1.5 drip | 16.5 |
| F | SE | 25.1–25.8 |
| G | SE | 22.8 |
| H | SE Flaming drip | 21.6 |
| J | SE | 26.5 |

The above results show that the composition of the present invention F and J significantly enhance the flame retardance of the high impact polystyrene as compared to the control and the composition H, of the prior art.

EXAMPLE 4

Flame retardant formulations were prepared consisting of 100 parts of LDPE, 8 parts of silicone gum, 2 parts of silica, 3 parts of a polydimethylsiloxane fluid, 2 parts of antioxidant Agerite MA, 3 parts of VulCup R ® peroxide and 18 parts of Group IIa metallic salt. In addition, a formulation was also prepared free of Group IIa salt and a formulation was also prepared containing a lead phthalate in place of the Group IIa metallic salt. The horizontal burning distance and drip behavior of the various formulations in the form of press cured slabs as described in Table III were evaluated as shown as follows:

TABLE VII

| Metal Salt | Horizontal Burning Distance | Drip Behavior |
| --- | --- | --- |
| None | 2" | Drips |
| Ca Stearate | SE | No drip |
| Mg Stearate | SE | No drip |
| Mg Phthalate | SE | No drip |
| Pb Phthalate | SE | No drip |

The above results show that the Group IIa metallic salt of the present invention is substantially equivalent to lead phthalate with respect to imparting flame retardant properties to low density polyethylene Although the above examples are directed to only a few of the very many variables which can be employed in the practice of the present invention it should be understood that the present invention is directed to a much broader variety of flame retardant organic resin compositions based on the use of polydiorganosiloxanes and Group IIa metal salts, which preferably are Group IIa $C_{(10-20)}$ carboxylate metal salts.

What we claim as new and desire to secure by Letters Patent of the United States is:

1. Flame retardant compositions comprising by weight
    (A) 70 to 98% of polyolefin,
    (B) 1 to 10% of silicone, and
    (C) 1 to 20% of Group IIa metal $C_{(6-20)}$ carboxylic acid salt.
2. A composition in accordance with claim 1, where the polyolefin is high density polyethylene.
3. A composition in accordance with claim 1, where the polyolefin is low density polyethylene.
4. A composition in accordance with claim 1, where the polyolefin is polypropylene.
5. A composition in accordance with claim 1, where the polyolefin is high impact polystyrene.
6. A composition in accordance with claim 1, where the silicone is a polydiorganosiloxane gum.
7. A composition in accordance with claim 1, where the Group IIa metal salt is magnesium stearate.
8. A composition in accordance with claim 1, containing an effective amount of an organic peroxide.
9. A composition in accordance with claim 1 having a reinforcing silica filler.
10. A composition in accordance with claim 1, where the silicone is an methylvinyl containing polydimethylsiloxane.
11. A flame retardant composition in accordance with claim 1, where the polyolefin is an acrylonitrile-butadiene-styrene terpolymer.
12. An electrical conductor comprising a metallic conductive element insulated with a composition comprising polyolefin, a silicone and a Group IIa metal $C_{(6-20)}$ carboxylic acid salt in the following proportions by weight
    (D) 70% to 98% of polyolefin
    (E) 1 to 10% of silicone and
    (F) 1 to 20% of Group IIa metal $C_{(6-20)}$ carboxylic acid salt.
13. An electrical conductor in accordance with claim 12, where the insulation comprises a low density polyethylene having a silicone and a Group IIa metal $C_{(6-20)}$ carboxylic acid salt.
14. An electrical conductor in accordance with claim 13, where the low density polyethylene has been cross-linked with an organic peroxide.
15. An electrical conductor in accordance with claim 12, where the polyolefin is an acrylonitrile-butadiene-styrene terpolymer.

* * * * *